(12) United States Patent
Sanchez et al.

(10) Patent No.: US 7,497,474 B2
(45) Date of Patent: Mar. 3, 2009

(54) CROSS-CAR ADJUSTABLE STRAP BUCKLE

(75) Inventors: Miguel Sanchez, Rochester Hills, MI (US); Brian Serra, Highland, MI (US)

(73) Assignee: Autoliv ASP, Inc., Ogden, UT (US)

( * ) Notice: Subject to any disclaimer, the term of this patent is extended or adjusted under 35 U.S.C. 154(b) by 102 days.

(21) Appl. No.: 10/899,229

(22) Filed: Jul. 26, 2004

(65) Prior Publication Data
US 2006/0017275 A1    Jan. 26, 2006

(51) Int. Cl.
B60R 22/00    (2006.01)
(52) U.S. Cl. ........................ 280/801.1; 297/468
(58) Field of Classification Search .............. 280/808, 280/801.1, 801.2, 803, 804, 805, 807; 297/468, 297/482; 403/111, 112, 119, 120, 121, 388
See application file for complete search history.

(56) References Cited

U.S. PATENT DOCUMENTS

| | | | | |
|---|---|---|---|---|
| 4,118,068 A * | 10/1978 | Fohl | ................... | 297/481 |
| 4,451,087 A | 5/1984 | Tamamushi | | |
| 4,645,232 A * | 2/1987 | Hamada et al. | .......... | 280/801.1 |
| 4,863,219 A | 9/1989 | Ochiai | | |
| 4,928,992 A * | 5/1990 | Qvint et al. | ............. | 280/801.1 |
| 5,016,916 A * | 5/1991 | Yokote et al. | ............ | 280/801.2 |
| 5,020,856 A | 6/1991 | George | | |
| 5,031,961 A | 7/1991 | Isern | | |
| 5,125,611 A | 6/1992 | Cox | | |
| 5,215,332 A * | 6/1993 | De Sloovere | ............ | 280/801.1 |
| 5,286,057 A * | 2/1994 | Forster | ...................... | 280/808 |
| 5,332,261 A * | 7/1994 | Siepierski | ................. | 280/801.1 |
| 5,863,069 A * | 1/1999 | Wickenheiser et al. | ...... | 280/751 |
| 5,885,047 A * | 3/1999 | Davis et al. | ................. | 414/490 |
| 6,116,696 A | 9/2000 | Widman et al. | | |
| 6,126,200 A | 10/2000 | Bell et al. | | |
| 6,328,386 B1 | 12/2001 | Good | | |
| 6,502,887 B1 | 1/2003 | Lansinger | | |
| 6,581,969 B2 * | 6/2003 | Nishide | ................... | 280/801.1 |
| 6,749,224 B1 * | 6/2004 | Stojanovski | ............. | 280/801.2 |
| 2002/0050707 A1 * | 5/2002 | Nishide | ................... | 280/801.1 |

FOREIGN PATENT DOCUMENTS

EP    0 004 485    4/1981

* cited by examiner

*Primary Examiner*—Eric Culbreth
*Assistant Examiner*—Joseph Rocca
(74) *Attorney, Agent, or Firm*—Sally J. Brown

(57) ABSTRACT

A seatbelt buckle system is disclosed that allows rotation of the seatbelt buckle in a transverse direction with respect to the vehicle body. The system includes a buckle fixed to a buckle attachment plate. The buckle attachment plate has a through aperture that cooperates with a fastener for attaching the buckle attachment plate to a vehicle structure such as a vehicle seat. Additionally, a spring is disposed between the buckle attachment plate and the head of the fastener. Further, the through aperture in the buckle attachment plate is oversized such that the buckle attachment plate and attached buckle can rotate along a longitudinal axis of the fastener.

13 Claims, 1 Drawing Sheet

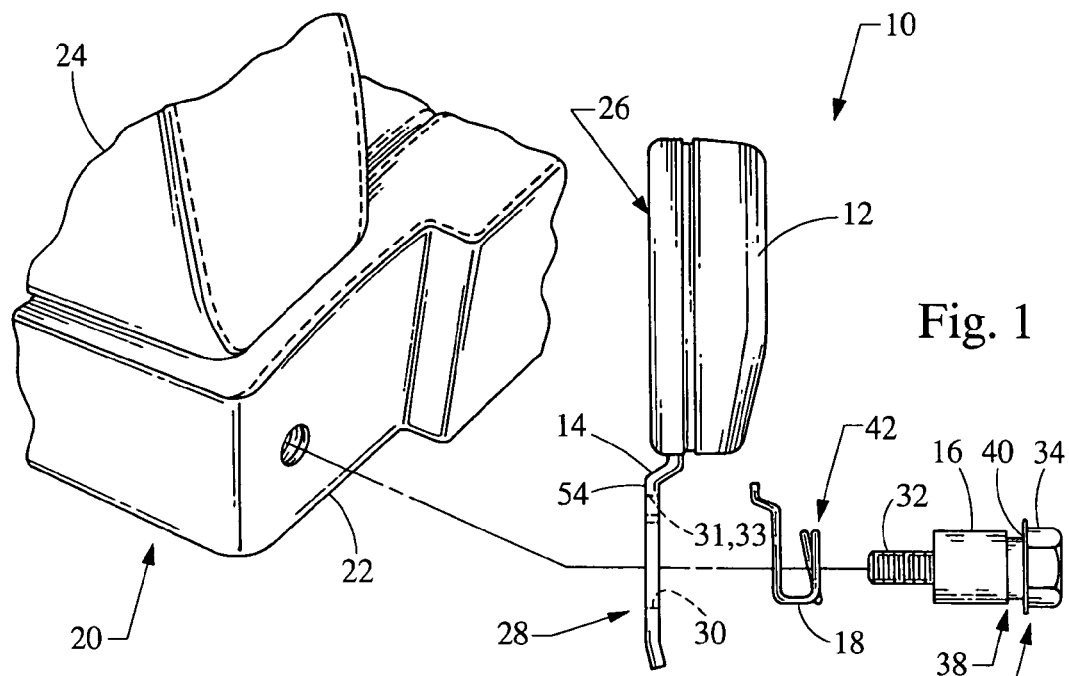
Fig. 1
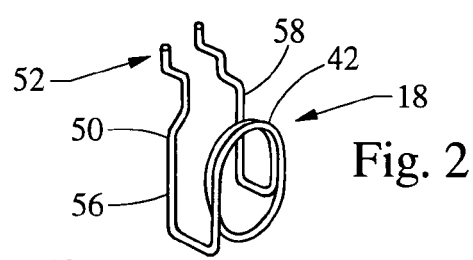
Fig. 2
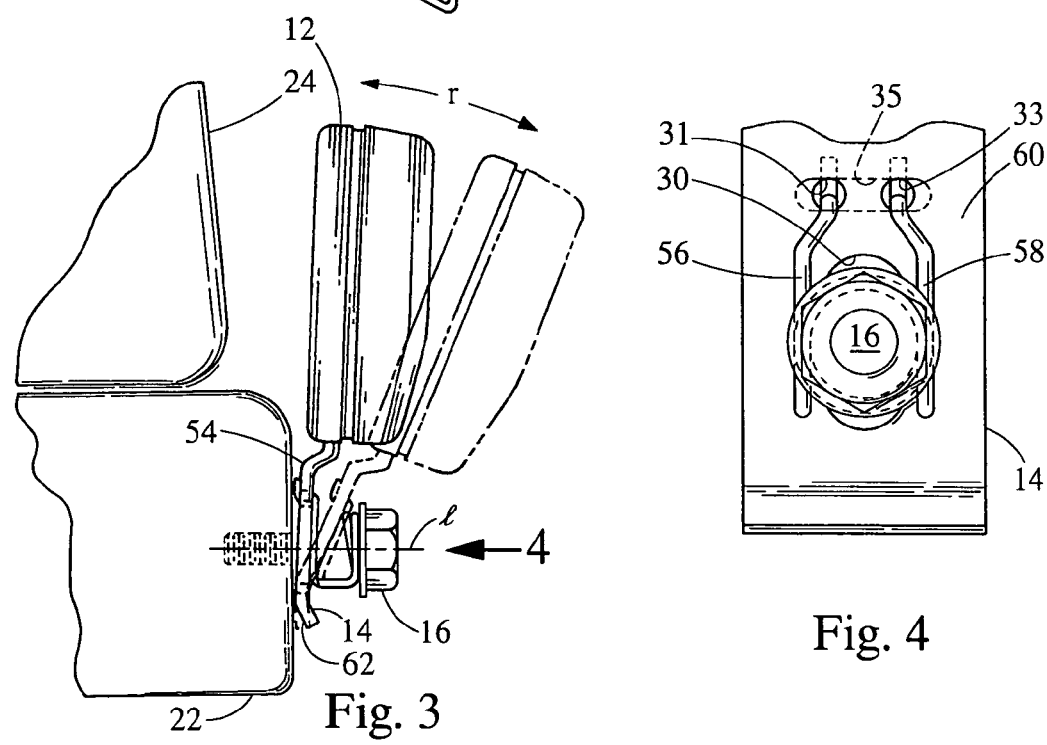
Fig. 3
Fig. 4

US 7,497,474 B2

CROSS-CAR ADJUSTABLE STRAP BUCKLE

TECHNICAL FIELD

The present invention relates generally to vehicle safety systems, and to seatbelt retractors having retractable seatbelt webbing slidably connected to a tongue plate that removably engages a seatbelt buckle mounted to a vehicle structure.

BACKGROUND

Conventional vehicles typically have both front and rear seatbelt assemblies for restraining vehicle occupants during a vehicle collision. While seatbelt systems are very effective at reducing a vehicle occupant's injuries resulting from a vehicle collision, they can cause some discomfort to the vehicle occupant as well.

Prior art systems have tried to minimize the occupant's discomfort caused by the seatbelt system by, for example, attaching the seatbelt buckle to the vehicle structure using a flexible member such as seatbelt webbing or a flexible metal strap or cable. While these prior art methods have achieved their intended purpose, many problems still exist. For example, manufacturing consistency and quality may be reduced using the webbing, cable or metal strap designs. In some cases, occupant comfort is also sacrificed.

Therefore, what is needed is a new and improved system and method for attaching the seatbelt buckle to the vehicle structure. This new and improved system and method should provide enhanced manufacturing consistency and quality as well as enhancing vehicle occupant comfort.

SUMMARY

In an aspect of the present invention, a seatbelt buckle system is provided which allows rotation of the seatbelt buckle in a transverse direction with respect to the vehicle body. The system includes a buckle fixed to a buckle attachment plate. The buckle attachment plate has a through hole that cooperates with a fastener for attaching the buckle attachment plate to a vehicle structure such as a vehicle seat. Additionally, a spring is disposed between the buckle attachment plate and the head of the fastener, i.e., an attachment plate fastener. Further, the through hole in the buckle attachment plate is oversized such that the buckle attachment plate and attached buckle can pivot about a longitudinal axis of the attachment plate fastener. The spring is configured to fixedly engage the buckle attachment plate and slidably engage the buckle attachment plate fastener. Thus, the embodiments of the present invention allow the buckle to pivot along a longitudinal axis of the attachment plate fastener and rotate about that same axis. Accordingly, the present invention provides enhanced manufacturing consistency and quality as well as enhanced occupant comfort.

In another aspect of the present invention, the buckle attachment plate has aperture or slot for fixedly engaging the spring.

In yet another aspect of the present invention, the spring includes a pair of end terminals or legs which engage the slot or aperture in the buckle attachment plate for presenting relative motion between the spring and the buckle attachment plate.

In yet another aspect of the present invention, the attachment plate fastener includes a channel or race for slidably engaging and receiving the spring. The race or channel is oversized relative to the spring diameter or cross-section to allow unrestricted sliding of the spring within the channel.

In still another aspect of the present invention, a system for securing a seatbelt buckle to a vehicle structure is provided. The system includes a buckle attachment plate having the seatbelt buckle mounted thereto, a spring and a fastener. The buckle attachment plate has an attachment aperture and a spring attachment aperture. The fastener is inserted through the attachment aperture and engages the vehicle structure. The fastener has a spring attachment portion having a channel. The spring including a length of wire having a loop that engages the channel of the spring attachment portion of the fastener and is in engagement with the spring attachment aperture of the buckle attachment plate for allowing the seatbelt buckle to rotate relative to the vehicle structure.

In yet another aspect of the present invention, a method for securing a seatbelt buckle to a vehicle structure is provided. The method includes attaching a seatbelt buckle to a buckle attachment plate wherein the buckle attachment plate has an attachment aperture, inserting a fastener through the attachment aperture and into engagement with the vehicle structure, and securing a spring to the fastener and into engagement with the buckle attachment plate for allowing the buckle to rotate relative to the vehicle structure.

These and other aspects and advantages of the present invention will become apparent upon reading the following detailed description of the invention in combination with the accompanying drawings.

BRIEF DESCRIPTION OF THE DRAWINGS

FIG. 1 is an exploded perspective view of the seatbelt buckle system, in accordance with an embodiment of the present invention;

FIG. 2 is a perspective view of the spring of the seatbelt buckle system, in accordance with an embodiment of the present invention;

FIG. 3 is a rear view of the assembled seatbelt buckle system mounted to a vehicle structure, in accordance with an embodiment of the present invention; and FIG. 4 is a partial side view of the seatbelt buckle attachment plate, attachment plate fastener and spring, in accordance with an embodiment of the present invention.

DESCRIPTION

Referring now to FIG. 1, a perspective exploded view of a seatbelt buckle system 10 of the present invention is illustrated. System 10 includes a seatbelt buckle 12 mounted to a buckle attachment plate 14, an attachment plate fastener 16 and a spring 18 disposed between buckle attachment plate 14 and fastener 16. As will be further illustrated, fastener 16 is inserted through spring 18 and buckle attachment plate 14 and into to a rigid structure of a vehicle (not shown) such as seat structure 20 to secure buckle 12. Seat structure 20, typically, includes a seat bottom structure 22 having a bottom seat cushion and a back seat structure 24 having a back seat cushion. Of course, the present invention contemplates that attachment plate 14 may be secured to any vehicle structure.

Seatbelt buckle 12 is a conventional buckle that is adapted to receive the tongue plate (not shown) of a conventional seatbelt system (not shown). Buckle attachment plate 14 is, generally, a rigid plate member having a buckle attachment end 26 for receiving buckle 12 and a relatively short attachment end 28 that is configured to receive attachment fastener 16 for pivotably securing attachment end 28 of attachment plate 14 to vehicle structure 20. Further, attachment plate 14 includes a through hole or slot 30 for receiving attachment fastener 16. Through hole or slot 30 is oversized to allow buckle 12 to pivot (in a direction indicated by arrow r) along a longitudinal axis ι of attachment fastener 16 (as shown in FIG. 3). Further, slot 30 allows buckle 12 and attachment plate 14 to freely rotate about fastener 16. A pair of apertures 31, 33 are also provided in attachment plate 14 for receiving and fixing spring 18 to plate 14. Alternatively, a slot 35 is provided in plate 14 for receiving and fixing spring 18 to plate 14.

Attachment fastener 16 has a threaded end 32 and a fastener head end 34. Threaded end 32 includes a plurality of threads for cooperating with internal threads in vehicle structure 20 to secure attachment plate 14 to the vehicle structure. Fastener head end 34 includes a conventional fastener head portion 36 for engaging a tool (i.e. a wrench) and a spring attachment portion 38 for engaging spring 18. Spring attachment portion 38 has a race or channel 40 disposed therein for cooperatively engaging spring 18 and fixing spring 18 to fastener 16. Channel 40 is sized to allow a fastener attachment portion 42 of spring 18 to fit therein and allow fastener attachment portion 42 to slide or rotate freely. Of course, the present invention contemplates other fastening devices other than bolts such as rivets, screws and the like.

Referring now to FIG. 2, spring 18 is shown in perspective view, in accordance with an embodiment of the present invention. Spring 18, as previously stated has a fastener attachment portion 42 that slideably engages channel 40 of attachment fastener 16 and has a plate attachment portion 52. In an embodiment of the invention, spring 18 is made of a wire material 50 formed in a predefined shape as illustrated. For example, wire material 50 is formed into one or more loops that define fastener attachment portion 42. The present invention contemplates other predefined shapes for wire material 50 for attaching spring 18 to the fastener 16.

The plate attachment portion 52 of spring 18 is formed by the beginning and ending terminals of wire material 50. Several bends are formed in material 50 to allow plate attachment portion 52 to extend through attachment plate 14 and engage a rear surface 54 of attachment plate 14, as shown in FIGS. 1, 3 and 4. Further, a pair of vertical portions 56 and 58 are provided and formed to engage a front surface 60 of attachment plate 14. After insertion of the beginning and ending terminals of plate attachment portion 52 through holes 31, 33 or slot 35 (shown in dashed lines) vertical portions 56, 58 engage front surface 60 while beginning and ending terminals engage back surface 54 of plate 14. By this attachment scheme, spring 18 captures attachment plate 14 and flexibly retains plate 14 in a first position as shown in FIG. 3 (in solid lines) against seat bottom structure 22. Spring 18 is configured such that the spring exerts a sufficient force to keep the attachment plate and seatbelt buckle against the seat structure preventing vibration and rattling of attachment plate 14 during vehicle operation.

Referring now to FIG. 3, a partial rear view of assembled seatbelt buckle system 10 is illustrated attached to seat bottom structure 22, in accordance with the present invention. As indicated by arrow r, the mounting arrangement (described above) of attachment plate 14, fastener 16 and spring 18 allows for rotation toward and away from the upper and lower seat structures 22 and 24. In other words, buckle 12 is allowed to move transversely with respect to the body of the vehicle. As buckle 12 is moved transversely a lower portion 62 of attachment plate 14 contacts seat bottom structure 22 and forms a pivot point about which buckle 12 rotates. Buckle 12 will rotate transversely until a top portion of slot 30 contacts fastener 16. Further, buckle 12 is free to rotate about longitudinal axis ι of fastener 16. For example, buckle 12 is allowed to rotate towards the front or back of the vehicle.

Referring now to FIG. 4, a partial side view of attachment plate 14 is illustrated. As shown, aperture 30 is a slot or oversized aperture that allows plate 14 to move freely over fastener 16. In an embodiment of the present invention, spring 18 has two loops that are wrapped or wound around fastener 16. In this manner, spring 18 is secured to fastener 16. In yet another embodiment of the present invention, plate attachment portion 52 of spring 18 having vertical portions 56, 58 engage apertures 31, 33 or a slot 35 (shown in phantom) to secure the other end of the spring 18 to plate 14. Vertical portions 56, 58 have a plurality of bends formed therein to direct the terminal inward and into apertures 31, 33 or a slot 35.

Thus, as readily apparent from the above description and illustrations in FIGS. 1-4, seatbelt buckle system 10 provides a more manufacturable design that should result in a higher quality product. Moreover, the various embodiments of the present invention provide a seatbelt system that will accommodate a wide range of occupants by automatically adjusting to those particular occupants seating position as well as physical characteristics. For example, if the vehicle occupant has the physical characteristics of a small female, the system described above will self-adjust in cooperation with the rest of the seatbelt system to provide a fully functional, safe and comfortable seatbelt restraint system. On the other hand, if the occupant has the physical characteristics of a large male, the system described above will self-adjust (by buckle 12 rotating transversely) in cooperation with the rest of the seatbelt system to provide a fully functional, safe and comfortable seatbelt restraint system. Further, system 10 is configured to reduce or eliminate noise generated by components moving relative to one another (i.e., rattling). This is accomplished by biasing attachment plate 14 against the vehicle structure using spring 18.

As any person skilled in the art of seatbelt restraint systems and methods for restraining vehicle occupants in the event of a vehicle accident will recognize from the previous detailed description and from the figures, modifications and changes can be made to the preferred embodiments of the invention.

The invention claimed is:

1. A system for securing a seatbelt buckle to a vehicle structure, the system comprising:
   a buckle attachment plate having the seatbelt buckle mounted thereto and having an attachment aperture;
   a fastener having a longitudinal axis being inserted through the attachment aperture and engageable with the vehicle structure such that the longitudinal axis is generally transverse to the vehicle structure; and
   a spring having a first and a second end that are both connected to the buckle attachment plate and allowing the buckle attachment plate to rotate about the longitudinal axis such that the seatbelt buckle can be moved in a fore-aft direction relative to the vehicle structure, the spring further providing a force to bias the attachment plate against the vehicle structure while elastically yielding to permit transverse movement of the buckle attachment plate relative to the vehicle structure, wherein the fastener comprises a spring attachment portion for engaging the spring.

2. The system of claim 1 wherein the seatbelt buckle attachment plate further comprises a spring aperture for receiving a portion of the spring.

3. The system of claim 2 wherein the spring aperture is a slot.

4. The system of claim 1 wherein the spring attachment portion is a race or channel.

5. The system of claim 1 wherein the spring further comprises a length of wire.

6. The system of claim 5 wherein the length of wire further comprises a loop that is engageable with the spring attachment portion of the fastener.

7. The system of claim 5 wherein the length of wire further comprises two loops that are engageable with the spring attachment portion of the fastener.

8. A method for securing a seatbelt buckle to a vehicle structure, the method comprising:
   attaching a seatbelt buckle to a buckle attachment plate wherein the buckle attachment plate has an attachment aperture;
   inserting a fastener having a longitudinal axis through the attachment aperture and into engagement with the vehicle structure such that the longitudinal axis is generally transverse to the vehicle structure; and
   securing a spring to the fastener at a spring attachment portion of the fastener and connecting both a first and a second end of the spring to the buckle attachment plate to allow the buckle attachment plate to rotate about the longitudinal axis such that the seatbelt buckle can be moved in a fore-aft direction relative to the vehicle structure, the spring further providing a force to bias the buckle attachment plate against the vehicle structure while elastically yielding to permit transverse movement of the buckle attachment plate relative to the vehicle structure.

9. The method of claim 8 further comprises receiving a portion of the spring through a spring aperture disposed in the buckle attachment plate.

10. The method of claim 8 wherein engaging the spring further comprises engaging a race or channel in the spring attachment portion of the fastener.

11. The method of claim 8 further comprising engaging the spring attachment portion of the fastener with a loop of wire of the spring.

12. The method of claim 8 further comprising engaging two loops of the spring with the spring attachment portion of the fastener.

13. A system for securing a seatbelt buckle to a vehicle structure, the system comprising:
   a buckle attachment plate having the seatbelt buckle mounted thereto, wherein the buckle attachment plate has an attachment aperture and a spring attachment aperture;
   a fastener having a longitudinal axis being inserted through the attachment aperture and engageable with the vehicle structure such that the longitudinal axis is generally transverse to the vehicle structure, wherein the fastener has a spring attachment portion having a channel in between an engagement end and a fastener head; and
   a spring having a first and a second end that are both connected to the buckle attachment plate, the spring including a length of wire having a loop that is engageable with the channel of the spring attachment portion of the fastener and in engagement with the spring attachment aperture of the buckle attachment plate for allowing the buckle attachment plate to rotate about the longitudinal axis such that the seatbelt buckle can be moved in a fore-aft direction relative to the vehicle structure, the spring further providing a force to bias the buckle attachment plate against the vehicle structure while elastically yielding to permit transverse movement of the buckle attachment plate relative to the vehicle structure.

* * * * *